(12) United States Patent
Allen et al.

(10) Patent No.: US 6,495,204 B1
(45) Date of Patent: Dec. 17, 2002

(54) METHODS FOR MODIFYING MONOFILAMENTS, BUNDLES OF MONOFILAMENTS, AND FIBROUS STRUCTURAL MATERIAL

(75) Inventors: Charles A. Allen, Idaho Falls, ID (US); Mark D. Argyle, Idaho Falls, ID (US); Robert V. Fox, Idaho Falls, ID (US); Daniel M. Ginosar, Idaho Falls, ID (US); Stuart K. Janikowski, Idaho Falls, ID (US); David L. Miller, Idaho Falls, ID (US); W. Alan Propp, Idaho Falls, ID (US); William J. Toth, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 27 days.

(21) Appl. No.: 09/671,709

(22) Filed: Sep. 27, 2000

(51) Int. Cl.⁷ .................................................. B05D 7/00
(52) U.S. Cl. ................ 427/220; 427/215; 427/430.1; 427/443.2; 118/50; 118/400; 118/401; 118/404
(58) Field of Search .............................. 427/213.3, 215, 427/216, 217, 220, 430.1, 435, 436, 443.2; 118/692, 50, 400, 401, 404

(56) References Cited

U.S. PATENT DOCUMENTS

| | | | |
|---|---|---|---|
| 4,552,786 A | * | 11/1985 | Berneburg et al. ........ 427/248.1 |
| 4,961,913 A | * | 10/1990 | Sullivan ................. 264/211.17 |
| 5,709,910 A | * | 1/1998 | Argyle et al. ................ 118/405 |

* cited by examiner

Primary Examiner—Shrive P. Beck
Assistant Examiner—Rebecca A. Blanton
(74) Attorney, Agent, or Firm—Thorpe North & Western

(57) ABSTRACT

The present invention is related to the modifying of substrates such as monofilaments, bundles of monofilaments, and fibrous structural material with a modifying agent. The modifying agent is suspended or dissolved in a supercritical fluid, near-critical fluid, superheated fluid, superheated liquid, or a liquified gas and is deposited by rapidly altering the pressure in a chamber to deposit the modifying material onto the substrate.

31 Claims, 2 Drawing Sheets

METHODS FOR MODIFYING MONOFILAMENTS, BUNDLES OF MONOFILAMENTS, AND FIBROUS STRUCTURAL MATERIAL

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

FIELD OF THE INVENTION

The present invention is related to the modifying of substrates such as monofilaments, bundles of monofilaments fibrous structural materials, fibrous high-strength materials, fibrous construction materials, and fibrous engineered materials with a modifying agent comprised of, or conveyed by a supercritical or near-critical fluid.

BACKGROUND OF THE INVENTION

Methods have been developed for the coating or modification of monofilaments, bundles of monofilamnents, fibrous structural materials, fibrous high-strength materials, fibrous construction materials, and fibrous engineered materials, including optical fibers, filaments, cables, fiberglass, glass fibers, ceramic fibers, graphite fibers, composites fibers, metal fibers and wires, that may be constructed of metals, alloys, inorganics, organometallics, salts, minerals, structural polymers, single-strand polymers, filamentous polymers, and the like. For example, polystyrene is known to be a good coating for glass optical fibers to increase durability. These coatings, however, are generally applied in a variety of ways with chemical treatment processes. Some of these methods of chemical treatment (for coating, impregnation, surface modification, etc.) include solvent-based systems and melt-based systems.

Solvent-based chemical treatment systems can include organic or inorganic materials in solutions such as aqueous solutions wherein the organic or inorganic material is dissolved, suspended, or otherwise dispersed in the solution. In the area of coating of glass fibers, U.S. Pat. Nos. 5,055,119, 5,034,276 and 3,473,950 disclose examples of such chemical treatments. Typically, with chemical treatment of some of the prior art, solvents are used to lower the viscosity of the chemical treatment to facilitate wetting of the glass fibers. The solvent is substantially unreactive with the other constituents of the chemical treatment and is driven out of the chemical treatment after the wetting of the glass fibers. In each process for applying solvent-based chemical treatments, an external source such as heat can be used to evaporate or otherwise remove the water or other solvent from the applied chemical treatment, leaving a coating of organic material on the glass fibers. With melt-based chemical treatment systems, thermoplastic-type organic solids can be melted and applied to various fibrous structures. Again, in the area of glass coating, U.S. Pat. Nos. 4,567,102, 4,537,610, 3,783,001 and 3,473,950 disclose examples of such melt-based chemical treatments of glass fibers. These methods and others have been used in the prior art to coat various elongated materials including monofilaments, bundles of monofilaments, and fibrous structures.

Supercritical fluids have been used previously to coat elongated materials such as fibers, metals, and the like. However, when such supercritical fluids have been used, they have typically been applied by one of a few methods. Several of these techniques involve the application of one or more modifying agent by batch soaking in an enclosed chamber. Other methods include processes based upon spraying from a pressurized chamber through a narrow nozzle.

With regard to spray-on deposition, air pressure sprayers have been used to contain supercritical and near-critical fluids (carriers) containing coating material. Upon spraying of the fluid onto the substrate, the supercritical fluid carrying the coating material leaves the high pressure environment and is exposed to a normal atmospheric environment. Thus, the supercritical fluid is exposed to low pressure and can evaporates leaving behind a coating material or modifying agent. This coating material or modifying agent can be deposited onto, or modify the substrate. Examples of typical spray depositions of the prior art include U.S. Pat. Nos. 4,582,731, 4,734,227, 4,734,451, 4,970,093, 5,032,568, 5,213,851, and 5,997,956. Regarding supercritical fluid batch processes, the substrate is typically immersed and then the pressure is dropped, depositing the coating. This is usually followed by a drying stage. In a related embodiment, fluorocarbon dipolymers can be used to enhance solubility of polar components in supercritical fluid. However, this is still a batch process.

Though the use of liquified gas, supercritical fluids, and near-critical liquids and gases have been used to coat solid or other fibrous substrates in the prior art, none presently known by the applicant appear to provide a system and method for modifying substrates such as monofilaments, bundles of monofilaments, fibrous structural materials in a continuous system that does not utilize spray-on or batch coating processes.

SUMMARY OF THE INVENTION

It has not been recognized that providing methods of coating monofilaments, bundles of monofilaments, and fibrous structural materials in a continuous system would be a significant advance in the art. Thus, it would be useful to provide methods of physically or chemically modifying such substrates in accordance with the principles disclosed herein.

The present invention is drawn to a method of modifying elongated monofilaments and bundles of monofilament, preferably utilizing any device related to that described in accompanying FIG. 1. The basic method can be broken down into several steps. One of the steps includes providing a treatment apparatus chamber having a passageway passing entirely therethrough, wherein the passageway comprises a first region, a second region, and a constricted medial region between the first region and the second region. An additional step involves passing a monofilament or a bundle of monofilaments through the passageway so that the monofilament or bundle of monofilaments move continuously therethrough. As the monofilament or bundle of monofilaments is passed through the passageway, the step of introducing a chemical treatment mixture into the constricted medial region of the passageway is carried out. The chemical treatment mixture comprises a modifying composition in a carrier medium that can be a supercritical fluid, a near-critical fluid, a superheated fluid, a superheated liquid, or a liquified gas. Thus, the modifying composition can be separated from the carrier medium upon a pressure drop when the mixture is flowed through the constricted region of the passageway. Preferably, the pressure drop causes a rapid expansion of the carrier medium, though this is not required.

Once the substrate has been modified, optionally, the carrier medium and any unused modifying composition can be removed and/or recycled for further use. This method can also be carried out using different substrates than monofilaments and bundles of monofilaments. For example, a similar method can be carried out by applying a modifying composition to a fibrous structural material, such as roving material, according to the steps described above.

BRIEF DESCRIPTION OF THE DRAWINGS

In the accompanying drawings which illustrate embodiments of the invention.

DETAILED DESCRIPTION OF THE INVENTION

Figure 1:
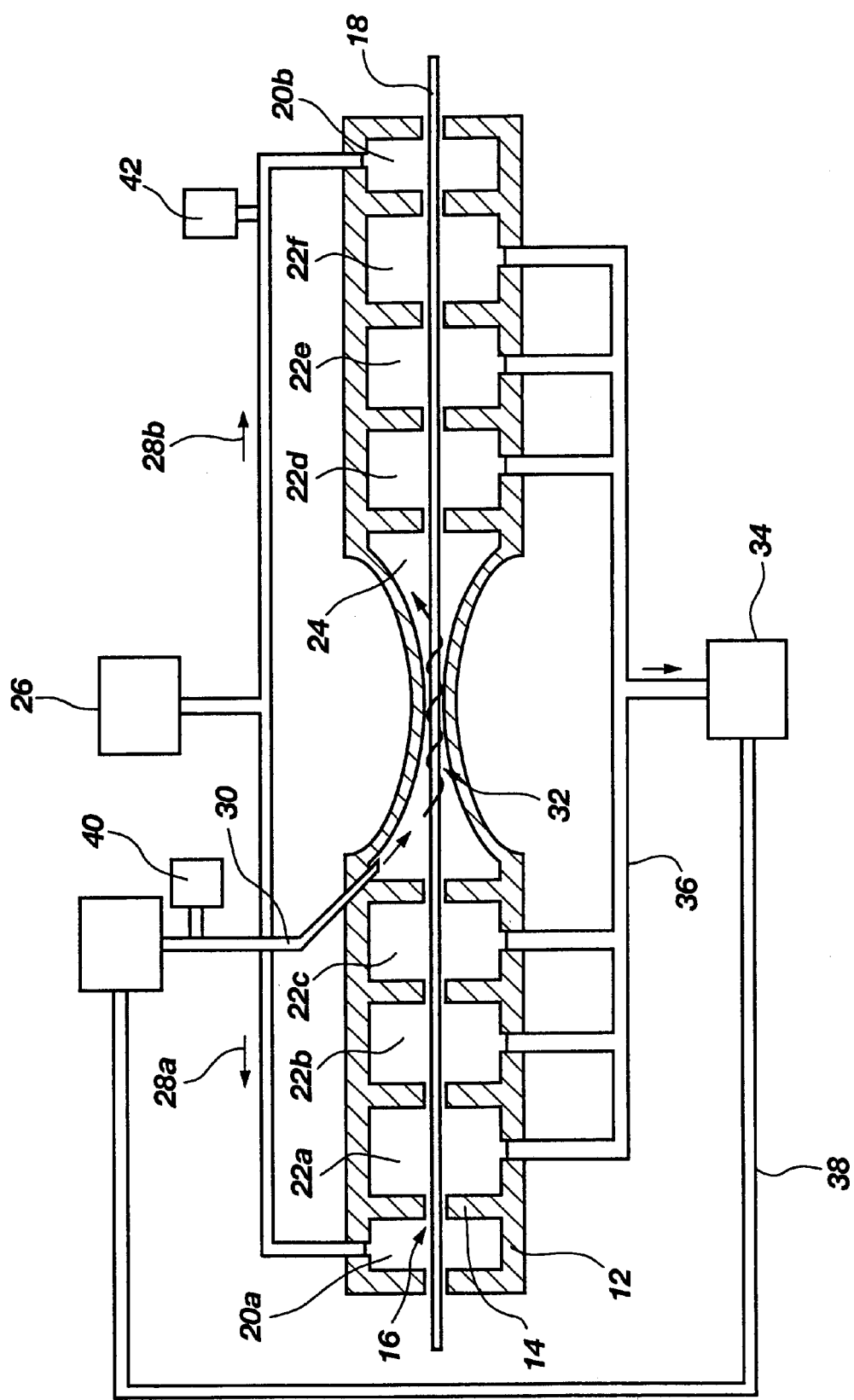
FIG. 1 is a schematic representation of a device in which the methods of the present invention can be carried out.

Before the present invention is disclosed and described, it is to be understood that this invention is not limited to the particular configurations, process steps and materials disclosed herein as these may vary to some degree. It is also to be understood that the terminology used herein is used for the purpose of describing particular embodiments only, and is not intended to be limiting as to the scope of the present invention. The invention will be limited only by the appended claims and equivalents thereof.

It must be noted that, as used in this specification and the appended claims, singular forms of "a," "an," and "the" include plural referents unless the content clearly dictates otherwise.

For the purposes of this document, "monofilament" can include any single strand structure that is elongated along one axis. Such structures can include, but are not limited to, single strand metals, alloys, organometallics, wires, cables, composites, salts, optical fibers, filaments, glass fibers, graphite fibers, fiberglass, structural polymers, filamentous polymers, organic polymers, inorganic polymers, fibrous inorganics, fibrous minerals, fibrous engineered materials, fibrous construction materials, fibrous structural materials, fibrous high strength materials, glasses, ceramics, super cooled liquids, and combinations thereof.

"Bundle of monofilaments" shall include any combination of monofilaments that are similar in length, and wherein each monofilament essentially runs the entire length of the bundle. Thus, textile yarns are excluded because they consist of deliberately short fibers that are spun together to make up a long yarn structure. "Fibrous structural materials" are intended primarily for structural applications. Such materials are used to give shape to, add strength to, or otherwise be included in structures to impart desirable structural properties. For example, composites like boron or graphite fiber bundles can be used in fishing poles. However, other possible types of materials also can fit within this definition. For example, "fibrous high strength materials" or "high strength fibrous materials" are also included. These materials can be comprised of many fibers constructed for high strength application. For example, a fiberglass roving used in the construction of archery equipment is an example of a high strength fibrous material. Additionally, "fibrous construction materials" are also included. These materials are intended for construction applications. Items that are constructed by woven, spun, braided, or laminated materials are exemplary of these types of materials. They are typically made from inorganic or organic components and can take the form of such things as construction fabrics as underlayment for streets and highways, roofing materials, etc. Further, "fibrous engineered materials" are also included. These materials are typically set apart from other materials in that they are manufactured to closer tolerances and have high quality control associated with their manufacture, i.e. exacting quality standards. Composite materials like boron or graphite sheets used in aircraft applications as well as certain optical fibers, structural materials, etc., are examples of fibrous engineered materials. They may be used to give shape, add strength, or impart other chemical or physical characteristics to the structure they help comprise.

"Supercritical fluid" shall be defined as a carrier or a carrier/chemical modifier mixture which is at a temperature above its critical temperature.

"Near-critical fluid" includes conditions where the carrier is either at or below the critical temperature or pressure for the carrier (or carrier with the chemical modifier) wherein the properties of the mixture are at a state where they begin to approach those of a supercritical fluid. Near-critical fluid can further be divided into subcatagories "near-critical gas phase" and "near-critical liquid phase" depending on the state that the fluid is in. "Near-critical gas phase" exists at pressures either less than or equal to the critical pressure and less than the bubble point pressure with temperatures somewhat below to above the critical temperature ($0.9T_c$ and above). "Near-critical liquid phase" is defined as the phase that exists at temperatures either less than or equal to the critical temperature and pressures either greater than or equal to the bubble point pressure of the carrier and/or the carrier and the chemical modifier.

"Liquefied gas" includes all gases that are at a temperature and/or pressure where they are in a liquid state, but can readily be changed to a gaseous state by altering the temperature or pressure.

"Superheated fluid" shall be defined as all liquids that can readily be changed to a gaseous state by reducing the pressure. Typically, this is a liquid which is heated above the temperature at which a change of state would normally take place without any change of state having occurred. An example would be pressurized water above 100° at sea level.

"Superheated liquid" shall be defined a liquid, which is heated above the temperature at which a change of state would normally take place, without said change of state having occurred. An example would be pressurized water above 100° C.

"Modifying agent" and "modifying composition" can be used interchangeably and shall include any substance used for chemical or non-chemical modification of a substrate. Thus, organic coatings, inorganic coatings, reactive coatings, sensor coatings, catalytic coatings, conductive coatings, material expanders, impregnators, extractors, surface functionalizers, and other modifiers are included within the present definition.

"Fluid" or "critical fluid" used generically shall include supercritical fluid, near-critical fluid, a superheated fluid, a superheated liquid, and liquefied gas, unless the context clearly dictates otherwise.

Turning now to FIG. 1, a schematic representation of a device in which the methods of the present invention can be carried out is shown. A housing 12 is shown having a plurality of baffles 14 which define a series of small orifices 16 for allowing monofilaments or bundles of monofilaments 18 (or other elongated structures such as roving, etc.) therethrough. The baffles 14 can be adjustable to compensate for various sized substrates. Three different types of chambers are shown which include end seals 20a,b, expansion chambers 22a,b,c,d,e,f, and a venturi chamber 24. The end seals 20a,b are maintained at a desired pressure by a seal fluid using a seal fluid regulator 26. If two seal fluid regulators are used, both ends can be at different pressures, allowing for more flexibility in processing. A positive flow 28a,b of seal fluid is maintained within the end seals 20a,b such that any fluids within the device are not allowed to substantially leak into the atmosphere.

The venturi chamber 24 is the chamber where the substrate is modified by the modifying material. Essentially, a feed fluid comprised of a carrier (which can be a supercritical fluid, a near-critical fluid, a superheated fluid, a superheated liquid, or a liquified gas) and a modifying material (for coating or otherwise modifying the substrate) are fed into the venturi chamber 24 through an injector 30. As the injector 30 injects the feed fluid toward a constricted area 32 of the venturi chamber 24, the pressure drops and causes carrier to release or precipitate out the modifying material effectuating the modification of the substrate. Though the chamber shown is a venturi chamber, other chamber shapes can be used where a pressure drop would be effectuated. For example, a cylindrical chamber having a small orifice dividing two larger areas of the chamber could be used. Thus, in the constricted area, the pressure drops, depositing the modifying material into or onto the substrate.

The expansion chambers 22a,b,c,d,e,f are used, in part, to collect any seal fluid or feed fluid, i.e., carrier and/or modifying material, and can be maintained at desired pressures (depending upon the pressure and/or temperature of each fluid and the configuration of the expansion chambers and/or baffles 14). In one embodiment, expansion chambers 22a,b,c can be used to ratchet up the pressure sequentially in preparation for applying a modifying composition to the substrate. Thus, chamber 22b can be a higher pressure than expansion chamber 22a and a lower pressure than 22c. Conversely, expansion chambers 22d,e,f can be used to ratchet down the pressure for reentry of the substrate into ambient pressures. Thus, expansion chamber 22e can have a higher pressure than expansion chamber 22f and a lower pressure than expansion chamber 22d. Any feed fluid or seal fluid injected into the system can be collected from the expansion chambers 22a,b,c,d,e,f and sent to a recycling area 34 through recycling lines 36 for processing and/or further use. A recycling conduit 38 is also shown for transporting the used modifying composition to the injector for further use.

The injector can be configured to inject the process fluids tangentially, perpendicularly, or at any other functional angle. For example, a tangentially angled injector could be used in a chamber having two larger opposing regions, separated by a constricted medial region. Additionally, multiple injectors can be used to ensure that all surfaces of the non-equidimensional substrate can be appropriately modified. Alternatively, a perpendicular injector at close proximity to a substrate could be used to impregnate the substrate with higher pressure injections. In another embodiment, the processing chamber can utilize a treatment mixture comprised of the modifying agent and a carrier for applying the modifying agent, wherein the carrier is selected from the group consisting of supercritical fluid, near-critical fluid, superheated fluid, a superheated liquid, and liquefied gas.

Additional optional features can include a temperature regulator 40 for regulating the temperature of the venturi (or other) chamber. Also, a pressure regulator 42 is also shown which can regulate the pressure of end seal 20b.

Figure 2:
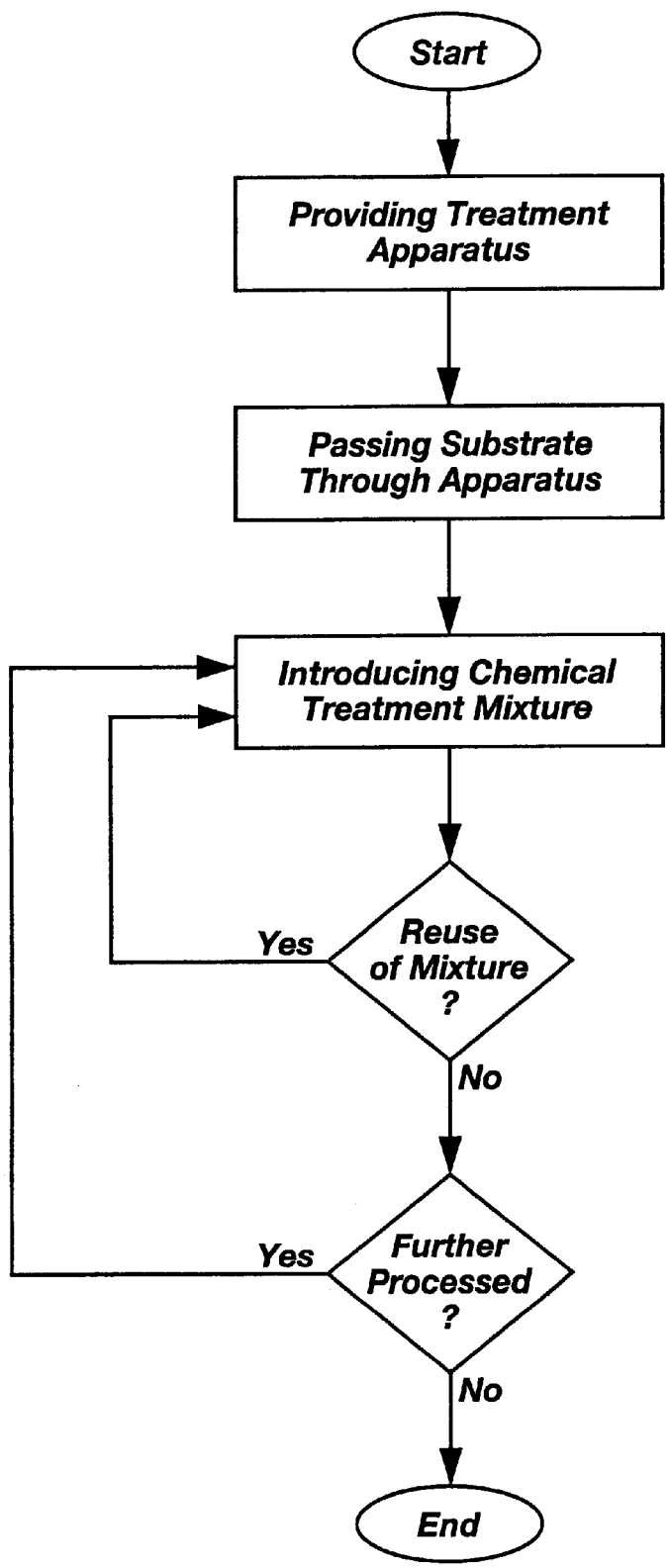
FIG. 2 is a flow diagram of a preferred method of the present invention.

Turning now to FIG. 2, a flow diagram of a method of the present invention is shown. Particularly, a method of modifying elongated substrates, particularly monofilaments, bundles of monofilaments, and fibrous structural materials is shown. Step 52 comprises providing a treatment apparatus chamber having a passageway passing entirely therethrough wherein the passageway comprises a first region, a second region, and a constricted medial region between the first region and the second region. Step 54 depicts the passing of a substrate such as a monofilament, a bundle of monofilaments, or a fibrous structural material through the passageway so that the substrate moves continuously therethrough. Step 56 shows the introducing of a chemical treatment mixture into the constricted region of the passageway during movement of substrate through the passageway. In that step, it is preferred that the mixture be comprised of a modifying composition dispersed or dissolved within a carrier medium being selected from the group consisting of a supercritical fluid, a near-critical fluid, a superheated fluid, a superheated liquid, and a liquified gas. Thus, when the modifying composition is separated from the carrier medium upon a pressure drop (when the mixture is flowed through the constricted region of the passageway), the modifying composition can be applied to the substrate, i.e., monofilament, bundle of monofilaments, fibrous structural materials, to produce a modified substrate. The carrier medium and/or any unused modifying material can then be removed from the passageway, either into optional expansion chambers or directly from the passageway. Once removed, the collected matter can either be reintroduced at step 56 for further use 58 or further processed 60 prior to reintroduction.

With these figures in mind, the present invention is drawn to methods of modifying elongated monofilaments, bundles of monofilament, or fibrous structural materials, preferably by utilizing any device related to that described FIG. 1. The basic method can be broken down into several steps. One of the steps includes providing a treatment apparatus chamber having a passageway passing entirely therethrough, wherein the passageway comprises a first region, a second region, and a constricted medial region between the first region and the second region. An additional step involves the passing of a substrate such as an elongated monofilament, a bundle of monofilaments, or a fibrous structural material through the passageway so that the substrate can move continuously therethrough. As the substrate is passed through the passageway, the step of introducing a chemical treatment mixture into the constricted region of the passageway can be carried out. The chemical treatment mixture comprises a modifying composition in a carrier medium (preferably dispersed or dissolved therein). The carrier medium is preferably a supercritical fluid, a near-critical fluid, a superheated fluid, a superheated liquid, or a liquified gas. Thus, the modifying composition can be separated from said carrier medium upon a pressure drop when the mixture is flowed through the constricted region of the passageway. Preferably, the pressure drop causes a rapid expansion of the carrier medium, though this is not required. Upon the pressure drop, the modifying composition is applied to the substrate to produce a modified substrate. Optionally, the carrier medium and any unused modifying composition can be removed and recycled for further use.

In the present method, a monofilament, bundle of monofilaments, or fibrous structural material can be continuously removed from the chamber at the same rate that the monofilament or bundle of monofilaments are continuously fed into the chamber. If monofilaments or bundle of monofilaments are being modified, then some appropriate substrates can include metals, alloys, organometallics, wires, cables, composites, salts, optical fibers, filaments, glass fibers, graphite fibers, fiberglass, structural polymers, filamentous polymers, organic polymers, inorganic polymers, glasses, ceramics, super cooled liquids, and combinations thereof. Additionally, no matter what substrate is used, the modification can be in form of a coating, impregnation, expansion of the substrate, extraction from the substrate, functionalization of the surface, forming of a composite, and other desirable modifications as could be ascertained by one skilled in the art. If a coating is the modification being applied, then coatings such as organic coatings, inorganic coatings, reactive coatings, sensor coatings, catalytic coatings, conductive coatings, and combinations thereof can be effectuated.

In the area of textiles, a system for dying or sizing textile yarns has been disclosed that departs from typical batch processes previously known. Specifically, U.S. Pat. No. 5,709,910, the entire teachings of which are incorporated herein by reference, discloses methods for applying textile treatment compositions to textile materials. This system comprising a conduit member which includes a passageway having a first end, a second end, and a medial portion with a constricted (narrowed) region. The passageway may include at least one baffle having an opening therethrough. In the system, a yarn strand is then moved through the passageway. A sizing agent or dye is dissolved in a supercritical fluid or liquified gas which is thereafter introduced into the constricted region. As the supercritical fluid or liquified gas is forced through the constricted region, the pressure drops and the supercritical fluid or liquified gas changes in properties such that delivery of the treatment dye or sizing agent to the yarn is effectuated. The textile strands or yarn that may be sized or dyed include any textile yarns such as cottons, linens, polyesters, nylons, rayons, cotton blends, and the like. The textile yarns disclosed therein are lower strength yarns that are comprised of a series of short strand fibers that are spun together to form longer yarn products. Thus, stray fibers are inevitable and thus, provides the need for the use of lubricants, i.e., sizing agents, described therein. The temporary sizing agents and lubricants act to reduce the number of stray fibers that may damage the yarn using any high speed equipment in the process of preparing textiles, as well as reduce the friction between textile fibers during weaving. An additional function can include the strengthening of the yarn. Though such a system and methods have been shown to be effective for the sizing and dying of yarns, no such method or system exists for coating or chemically treating monofilaments, bundles of elongated monofilaments, and fibrous structural materials such as metals, alloys, organometallics, salts, optical fibers, filaments, cables, glass fibers, graphite fibers, fiberglass, structural polymers, single strand polymers, filamentous polymers, composites, and the like. Specifically, in the '910 patent, the temporary sizing compositions are deposited on the surface of the yarns as a coating that was bound only by physical forces of mechanical adhesion. In the present applications, the coatings are typically permanent and can be bound not only by physical forces, but can also include chemical coatings as well as other, non-coating modifications.

As described, the present invention includes methods for the application of a wide variety of chemical compositions, such as coatings, surface modifiers, chemical reactants, etc., for the modification of surface or bulk properties of substrates, such as filaments, strands, fibers, rovings, bundles, etc. (rovings include bundles of strands that are from natural or synthetic materials and can be used to reinforce plastic pipe, e.g., wrap around to strengthen, in circuit boards, and in aerospace applications). Processing will be accomplished by passing any of these or other similar substrates through a chamber which contains the desired chemical compositions either dissolved in or suspended in a suitable fluid existing in a variety of states including the supercritical, gaseous, superheated gaseous, heated compressed liquid, or near-critical fluids. The fluid itself can consist of either a single fluid or a mixture of two or more fluids, with a broad range of compositions. The substrates can be composed of a variety of organic and inorganic materials including metals, glasses, ceramics, polymers, and natural products, to name a few. The geometry of the substrates can include strands or fibers, bundles of strands or fibers, or any other elongated structure that can be fed though the continuous feed device of the present invention.

This process employs the enhanced chemical and physical properties of fluids under supercritical, near-critical, superheated, and liquified gas conditions, including solvating power, to treat the listed substrates in a continuous, efficient manner without the use of such structures as nip rollers. The device upon which the process is based also allows for the recovery of process energy and fluids to minimize waste.

The chemical compositions that can be applied by this process include both organic and inorganic materials including various chemical reagents, monomers, polymers, etc. These chemicals include, but are not limited to, various types of organic compounds and polymeric materials including acrylates, acrylic acid monomers, acrylic acid polymers, salts of acrylic acid copolymers, salts of polyacrylic acid, polyacrylates, polyvinyl chlorides, polyvinyl acetate, polyvinyl alcohols, cellulose derivatives, alginates, gums and starches, polyamides, polyimides, urethanes, polyurethanes, synthetic and natural resin varnishes, lacquers, polyphosphazenes, polyesters, polystyrenes, silicones, epoxies, fluoropolymers, etc. Chemical materials can be applied individually, sequentially, or as mixtures.

Virtually any elongated, monofilament, bundle of monofilaments, or fibrous structural material comprised of solid or non-fluid material can be coated or modified as described herein, provided the coating is functional with the substrate. Specifically, substrates can include continual or finite structures such as single strand metals, alloys, organometallics, wires, cables, composites, salts, optical fibers, filaments, glass fibers, graphite fibers, fiberglass, structural polymers, filamentous polymers, organic polymers, inorganic polymers, glasses, ceramics, super cooled liquids, and combinations thereof. Generally, the chemical modifiers or coatings in the form of organic coatings, inorganic coatings, reactive coatings, sensor coatings, catalytic coatings, conductive coatings, material expanders, impregnators, extractors, surface functionalizers, and other modifiers can be used with the present invention.

Turning to an individual discussion of the various type of substrate modifications that can occur, various modification methods are exemplified. With respect to the present invention, many of these process or substrate modification types described relate to single process chamber modifications, though any of these single process chamber modifications can be used in either the first and/or the second process chamber within the system of the present invention.

The process parameters used to modify a substrate, e.g., apply a coating, are highly dependent upon the modification material and the particular solvent used as the carrier fluid. Temperature and pressure, time of fluid exposure to the modifying material, and factors like turbulence, ultrasound, mechanical mixing, etc. affect the solubility of the modifying material and rate at which the modifying material can be dissolved into the fluid. A suitable range for temperature and pressure is that defined by the following: $0.9T_c \leq T \leq 2T_c$ where T and $T_c$ are expressed in degrees Kelvin, and $0.1P_c \leq P \leq 20P_c$ where P and $P_c$ are expressed in any suitable pressure units.

The first equation states that the useable operating temperature (T) for the solvent has a value equal to, or greater than 0.9 times the value of the critical temperature ($T_c$), and less than or equal to 2 times the critical temperature. The second equation similarly states that the useable operating pressure (P) for the solvent has a value equal to, or greater than 0.1 times the value of the critical pressure ($P_c$), and less than or equal to 20 times the critical pressure.

In general, it is desirable to saturate the fluid with the modifying material or dissolve an amount close to the saturation limit, but any level of solubilization will achieve the effect of substrate modification. In practice, this is highly dependent upon the choice of solvent and solute, and the range can be quite extensive. Two examples are given that illustrate this feature.

To impregnate poly(methyl methacrylate) (PMM) with pyrene to make a chemical sensor, one would dissolve 0.001 mole % pyrene in critical carbon dioxide (within the temperature and pressure conditions established above) and expose the PMM to the critical solution. Note that this is an extremely dilute solution and well below saturation. An example illustrating the opposite extreme where the solute is at 100 mole % (i.e. the solute is the solvent) would be the coating of an optical fiber with a poly-fluorinated hydrocarbon (PFH). In this example, one would bring the PFH to within the conditions described above (2 equations) and expose the optical fiber to the solvent/solute to achieve the desired coating.

Useable concentrations for other solvent/solute mixtures are intermediate between the values given above and are largely governed by the solubility of the solute in the particular critical fluid. The range extends from those that have very small solubility to those that are completely miscible. An example of the first is given above, while an example of the latter would be the use of tributyl phosphate (TBP) dissolved in supercritical carbon dioxide to be used as a decontamination solvent. In this case the solvent ($CO_2$) can be used in smaller proportion than the TBP and even below 10 mole percent.

With respect to organic and inorganic coatings, functional coatings intended to impart some physical attribute to the substrate being coated are included. Some physical attributes can include imparting corrosion resistance, degradation resistance, abrasion resistance, hardness, lubricity, light (or other radiation) reflective or absorptive properties, ductility, elasticity, material thickness, magnetic susceptibility, radiation degradation resistance, stress relief or resistance, thermal tolerance, and other similar attributes. Another function might be to encapsulate the coated material to restrict or modify the movement of chemicals across the coating. The nature of these coatings is that they are superficial and comprise a coating or barrier between the coated material and the external environment.

Organic modifiers or coatings can be comprised in majority or entirely of organic materials. Such organic coatings can include occluded particles or co-deposited organic materials or inorganic materials. In one embodiment, polystyrene in a fluid acetone can be applied to glass optical fibers to increase durability of the fibers. In another embodiment, varnish in a fluid paint thinner can be applied to copper wires for motor windings. In these and other embodiments, urethane or latex with or without nano-sized titania can be applied during the coating process or subsequent to coating and prior to drying of the organic, respectively, to form corrosion resistant materials. or solid supported catalysts.

Another coating type includes inorganic coatings. These coatings can be comprised of a majority or entirely of inorganic or non-organic materials, though occluded or co-deposited organic materials or other inorganic materials can also be present. Examples of inorganic coatings include metal and non-metal oxides, silicon, sulfur, or phosphorus-based polymers that may include dopants comprised of metals, organometallics, inorganics, hetero-atomic organics, minerals, or salts. In one example, silicone in a fluid petroleum ether can be applied to graphite fibers to impart a dielectric coating.

Reactive coatings refers to functional coatings intended to impart chemical reactivity or a specific chemical nature to various substrates, particularly with respect to otherwise inert or un-reactive materials. Many coatings can be both reactive or non-reactive depending upon the environment surrounding the coating or the specific application for the coating. For example, in the prior art, polyvinyl alcohol has been used as an un-reactive coating to temporarily lubricate textile fibers and possibly increase their tensile strength. However, as part of the present invention, polyvinyl alcohol can be used as a permanent coating to coat an optical fiber so it can behave as a sorbant coating that changes the optical properties of the fiber under differing chemical conditions.

Sensor coatings are those coatings that interact with the surrounding environment in a manner that changes one or more of their chemical or physical properties. This sensor characteristic can be used to sense changing conditions in an environment. Sensor materials can be reactive or non-reactive (but interactive) with the environment. As an example of a non-reactive (interactive) coating, pyrene in fluid toluene (carrier) can be applied to glass optical fibers to affect the light transmittance characteristics of the fiber in the presence of explosives. As an example of a reactive coating, polysulfones can be applied via critical fluid toluene or methylene chloride to optical fibers such that the sulfones react with acidic or basic media and change the light transmitting properties of the fiber.

Catalytic coatings, or coatings that interact chemically with the surrounding environment in a manner wherein the coating behaves as a catalyst in a chemical reaction, can also be formed. An example of a catalytic coatings includes the dissolving of silver chloride and a beta-diketone in fluid carbon dioxide. Thereafter the mixture is directed onto a substrate in the presence of hydrogen. Silver metal will be deposited onto the surface of the substrate and can behave as a catalyst. Additionally, chloroplatinic acid can be dissolved in a fluid water to coat a carbon fiber in accordance with the principals of the present invention. After such a deposition, sodium borohydride can be applied to reduce the platinum to the metallic state. Thus, the coating can be used as a catalyst. Additionally, other salts, solvents, complexing agents, substrates and reducing agents can yield similar results.

Conductive coatings refers to functional coatings that are thermally or electrically conductive. This includes coatings that are metallic, inorganic, organic, or polymeric in nature and/or composition. Metal coatings may be applied directly by coating the metal onto a substrate, or formed indirectly by applying a reactive coating containing the metal in a chemical state that can later be changed to make the coating conductive. For example, a substrate can be coated with a metal-containing flux (e.g. lead in zinc chloride) in fluid alcohol, after which, the coating can be heated or exposed to a chemical environment that would reduce the metal-containing flux to the metallic state (lead in this case). This process would produce "tinned" substrates suitable for soldering applications. Alternatively, a substrate can be coated with a sulfonated polystyrene in fluid acetone. Thus, when exposed to water, it will become electrically conductive. It would be appreciated to one skilled in the art that the use of other metal salts, fluxes, solvents, polymers, etc., will give similar results.

The invention can be practiced in processes where coating occurs in a one-pass mode or used in another configuration that would allow for multiple passes through the depositing chamber to achieve specific coating properties. Multiple coatings can be applied by passing the substrate through the device described herein multiple times. Additionally, pre- and post-coatings can be applied to substrates that will undergo other processing.

Generally, there are two broad categories of substrate modifications (outside of coating) that can be effectuated which include physical and chemical modification. Physical modifications refers to those modifications that are primarily characterized by, or made to enhance, physical characteristics of the substrate through application of the invention, but not through applying a coating per se. Examples of which are included herein.

Expanded materials include substrates that can be passed through a device like unto the device described herein under fluid pressure, whereupon exiting a higher the pressure region and entering another lower pressure region can cause rapid expansion of the substrate as a fluid is expanded out of the substrate. An example would be to pass a Plexiglas [poly(methyl methacrylate)] substrate through the device pressurized with fluid methylene chloride and hexane, whereupon exiting into a lower pressure region will cause expansion of the Plexiglas.

With regard to impregnation, suspended particulate material can be forced to impregnate a substrate by applying the particulate under pressure as a suspension in a fluid through a constriction, venturi, or other type of orifice that is at a near-contact distance from the substrate. An example would be to use nano-sized graphite particulate suspended in fluid mineral oil that is then applied under pressure to impregnate low-density polyethylene. Alternatively, a metal salt can be dissolved into a fluid and applied to a substrate that has some solubility in the fluid. Then the metal salt can also be converted to the metallic state by appropriate chemistry (reduction or oxidation), resulting in the metal being impregnated into the substrate. An example of this would be to dissolve silver chloride into fluid water acetone mixture and apply this mixture to a poly(methyl methacrylate) substrate. Next, by contacting the coating with a hydrogen or sodium borohydride, reduction will occur and reduce the silver to the metallic state while imbedded within the substrate.

With respect to chemical modification, the chemical characteristics of the substrate can be altered or enhanced. Examples include extraction and surface functionalization. Extractions apply to the removal of some component, such as a soluble component, from the substrate. An example would be to remove a plasticizer, monomer units, or unwanted oligomers from polymer substrates. One application would be to extract unwanted contaminants from soil or other environmental matrices such as removing crude oil from sand and soils where spills have occurred by applying alcohol or hexane in fluid form to a soil as it passed through the device. With respect to surface functionalization, a process and resultant state wherein the surface of the substrate is chemically modified can be accomplished. An example includes the passing of a cellulose substrate through a device described herein and expose it to one or more of fluid nitric acid, phosphoric acid, sulfuric acid, etc. to produce the nitrated, phosphated, sulfated, etc. cellulose, respectively. The nitrated cellulose could be used in explosives while the phosphated or sulfated cellulose could be used as ion-exchange material.

In addition to the coatings and/or chemical modifications described herein, even new materials can be made by combining the individual components, or combinations of components inside the supercritical or fluid region of a device of the present invention. Synthesis of the materials can occur as a singular process in which the material is not coated onto any substrate and exits the device in the general shape of the exiting orifice. Alternatively, new materials could be made in a similar manner, but coated onto a substrate passing through the device. In the latter case, the new material can be added to the substrate coating, impregnation, etc., in a similar manner to the other processes described herein. Additionally, polymer synthesis is also possible with by using a device such as that described herein. An example includes the synthesis of polystyrene (co-methyl methacrylate) where the individual components of styrene and methyl methacrylate are initially dissolved in fluid acetone and injected into one of the chambers of the device and allowed to mix. Upon exiting the chamber, the acetone is removed and benzoyl peroxide is injected to initiate the polymerization. Next, the polymer can be extruded through the exiting orifice of the device. Composites, which are those materials that are composed of more than one material and are solid in the finished state, mutually insoluble, and different in chemical nature can also be made. An example of a composite that can be made in this device is the coating of a graphite fiber with Plexiglas. Plexiglas can be dissolved in fluid methylene chloride and introduced into a chamber through which the graphite fiber is moving. In this embodiment, the Plexiglas will deposit onto the fiber and adhere to the fiber upon exiting the chamber where the solvent can be removed.

The current processes will provide coatings and other modifications with superior properties because of improved adhesion, bonding, and chemical reactivity or extraction. Exposure to the fluids during the application processes can also exert a cleaning influence on a substrate, removing surface contaminants that detrimentally affect the ultimate properties of the final product. It is anticipated that these processes can reduce failure rates and defects, and products with superior properties, such as tensile strength can be produced. Additionally, these processes provide opportunities for application of thermally labile or otherwise sensitive chemical compositions to a variety of substrates.

While the invention has been described with reference to certain preferred embodiments, those skilled in the art will appreciate that various modifications, changes, omissions and substitutions can be made without departing from the spirit of the invention. It is intended, therefore, that the invention be limited only by the following claims construed as broadly as applicable law allows including all proper equivalents thereof.

We claim:

1. A method of modifying elongated monofilaments and bundles of monofilament comprising:

providing a treatment apparatus chamber having a passageway passing entirely therethrough, said passageway comprising a first region, a second region, and a constricted medial region between said first region and said second region;

passing either a monofilament or a bundle of monofilaments through said passageway so that said monofilament or said bundle of monofilaments moves continuously therethrough;

flowing a chemical treatment mixture through said constricted medial region of said passageway during movement of said monofilament or said bundle of monofilaments through said passageway, said chemical treatment mixture comprising a modifying composition in a carrier medium, said carrier medium being selected from the group consisting of a supercritical fluid, a near-critical fluid, a superheated fluid, a superheated liquid, and a liquified gas, and wherein said modifying composition separates from said carrier medium upon a pressure drop when said chemical treatment mixture is flowed through said constricted region of said passageway applying said modifying composition to said monofilament or said bundle of monofilaments to produce a modified monofilament or a modified bundle of monofilaments by extracting a component of said monofilament or said bundle of monofilaments with said modifying composition.

2. The method according to claim 1, wherein said modifying composition separates from said carrier medium upon a pressure drop when said chemical treatment mixture is flowed through said constricted region of said passageway comprises separating said modifying composition through a rapid expansion of the carrier medium caused by said pressure drop.

3. The method according to claim 1, further comprising removing said carrier medium and any unused modifying composition from the passageway.

4. The method according to claim 3, further comprising recycling said carrier medium and any unused modifying composition for reuse.

5. The method according to claim 1, wherein passing either a monofilament or a bundle of monofilaments through said passageway so that said monofilament or said bundle of monofilaments moves continuously therethrough comprises continuously removing said monofilament or said bundle of monofilaments from the chamber at the same rate that the monofilament or bundle of monofilaments are continuously fed into the chamber.

6. The method according to claim 1, wherein passing either a monofilament or a bundle of monofilaments through said passageway comprises passing a monofilament or a bundle of monofilaments selected from the group consisting of metals, alloys, organometallics, wires, cables, composites, salts, optical fibers, filaments, fibrous inorganics, fibrous minerals, glass fibers, graphite fibers, fiberglass, structural polymers, filamentous polymers, organic polymers, inorganic polymers, glasses, ceramics, super cooled liquids, and combinations thereof through said passageway.

7. A method of modifying elongated monofilaments and bundles of monofilament comprising:

providing a treatment apparatus chamber having a passageway passing entirely therethrough, said passageway comprising a first region, a second region, and a constricted medial region between said first region and said second region;

passing either a monofilament or a bundle of monofilaments through said passageway so that said monofilament or said bundle of monofilaments moves continuously therethrough;

flowing a chemical treatment mixture through said constricted medial region of said passageway during movement of said monofilament or said bundle of monofilaments through said passageway, said chemical treatment mixture comprising a modifying composition in a carrier medium, said carrier medium being selected from the group consisting of a supercritical fluid, a near-critical fluid, a superheated fluid, a superheated liquid, and a liquified gas, and wherein said modifying composition separates from said carrier medium upon a pressure drop when said chemical treatment mixture is flowed through said constricted region of said passageway applying said modifying composition to said monofilament or said bundle of monofilaments to produce a modified monofilament or a modified bundle of monofilaments by expanding said monofilament or said bundle of monofilaments with said modifying composition.

8. The method according to claim 1, wherein extracting a component of said monofilament or said bundle of monofilaments with said modifying composition comprises extracting a soluble component of said monofilament or said bundle of monofilaments.

9. The method according to claim 1, wherein flowing a chemical treatment mixture through said constricted medial region of said passageway during movement of said monofilament or said bundle of monofilaments through said passageway, said chemical treatment mixture comprising a modifying composition in a carrier medium, said carrier medium being selected from the group consisting of a supercritical fluid, a near-critical fluid, a superheated fluid, a superheated liquid, and a liquified gas, and wherein said modifying composition separates from said carrier medium upon a pressure drop when said chemical treatment mixture is flowed through said constricted region of said passageway such that said modifying composition is applied to said monofilament or said bundle of monofilaments to produce a modified monofilament or a modified bundle of monofilaments comprises controlling pressure in said passageway using a pressure regulator.

10. The method according to claim 1, further comprising controlling a temperature in said passageway using a temperature regulator.

11. The method according to claim 1, wherein passing either a monofilament or a bundle of monofilaments through said passageway so that said monofilament or said bundle of monofilaments moves continuously therethrough comprises passing said monofilament or said bundle of monofilaments through said passageway at variable speeds.

12. The method according to claim 1, wherein passing either a monofilament or a bundle of monofilaments through said passageway so that said monofilament or said bundle of monofilaments moves continuously therethrough comprises passing said monofilament or said bundle of monofilaments through a passageway substantially sealed from an external environment by a pair of end seals small enough to substantially retain said chemical treatment mixture and large enough to allow said passing of said monofilament or said bundle of monofilaments.

13. The method according to claim 12 wherein passing said monofilament or said bundle of monofilaments through a passageway substantially sealed from an external environment by a pair of end seals comprises passing said monofilament or said bundle of monofilaments through a pair of gas fluid filled chambers.

14. The method according to claim 12, wherein passing said monofilament or said bundle of monofilaments through a passageway substantially sealed from an external environment by a pair of end seals comprises passing said monofilament or said bundle of monofilaments through a pair of end seals adjustable to various diameters for accepting various monofilaments and bundles of monofilaments for modification.

15. A method of modifying elongated fibrous structural material, said method comprising:
providing a treatment apparatus chamber having a passageway passing entirely therethrough, said passageway comprising a first region, a second region, and a constricted medial region between said first region and said second region;
passing a fibrous structural material through said passageway so that said fibrous structural material moves continuously therethrough;
flowing a chemical treatment mixture through said constricted medial region of said passageway during movement of said fibrous structural material through said passageway, said chemical treatment mixture comprising a modifying composition in a carrier medium, said carrier medium being selected from the group consisting of a supercritical fluid, a near-critical fluid, a superheated fluid, a superheated liquid, and a liquified gas, and wherein said modifying composition separates from said carrier medium upon a pressure drop when said chemical treatment mixture is flowed through said constricted region of said passageway applying said modifying composition to said fibrous structural material to produce a modified fibrous structural material by extracting a component of said fibrous structural material with said modifying composition.

16. The method according to claim 15 wherein said modifying composition separates from said carrier medium upon a pressure drop when said chemical treatment mixture is flowed through said constricted region of said passageway comprises separating said modifying composition through a rapid expansion of the carrier medium caused by said pressure drop.

17. The method according to claim 15, further comprising removing said carrier medium and any unused modifying composition from the passageway.

18. The method according to claim 17 further comprising recycling said carrier medium and any unused modifying composition for reuse.

19. The method according to claim 15 wherein passing a fibrous structural material through said passageway so that said modified fibrous structural material moves continuously therethrough comprises continuously removing said modified fibrous structural material from the chamber at the same rate that the fibrous structural material is continuously fed into the chamber.

20. The method according to claim 15, wherein passing a fibrous structural material through said passageway so that said modified fibrous structural material moves continuously therethrough comprises passing a roving through said passageway.

21. A method of modifying elongated fibrous structural material, said method comprising:
providing a treatment apparatus chamber having a passageway passing entirely therethrough, said passageway comprising a first region, a second region, and a constricted medial region between said first region and said second region;
passing a fibrous structural material through said passageway so that said fibrous structural material moves continuously therethrough;
flowing a chemical treatment mixture through said constricted medial region of said passageway during movement of said fibrous structural material through said passageway, said chemical treatment mixture comprising a modifying composition in a carrier medium, said carrier medium being selected from the group consisting of a supercritical fluid, a near-critical fluid, a superheated fluid, a superheated liquid, and a liquified gas, and wherein said modifying composition separates from said carrier medium upon a pressure drop when said chemical treatment mixture is flowed through said constricted region of said passageway applying said modifying composition to said fibrous structural material to produce a modified fibrous structural material by expanding said fibrous structural material with said modifying composition.

22. The method according to claim 15 wherein extracting a component of said fibrous structural material with said modifying composition comprises extracting a soluble component of said fibrous structural material.

23. The method according to claim 15, wherein flowing a chemical treatment mixture through said constricted medial region of said passageway during movement of said fibrous structural material through said passageway, said chemical treatment mixture comprising a modifying composition in a carrier medium, said carrier medium being selected from the group consisting of a supercritical fluid, a near-critical fluid, a superheated fluid, a superheated liquid, and a liquified gas, and wherein said modifying composition separates from said carrier medium upon a pressure drop when said chemical treatment mixture is flowed through said constricted region of said passageway such that said modifying composition is applied to said fibrous structural material to produce a modified fibrous structural material further comprises controlling pressure in said passageway using a pressure regulator.

24. The method according to claim 15, further comprising controlling a temperature in said passageway using a temperature regulator.

25. The method according to claim 15 wherein passing a fibrous structural material through said passageway so that said fibrous structural material moves continuously therethrough comprises passing said fibrous material through said passageway at variable speeds.

26. The method according to claim 15, wherein passing a fibrous structural material through said passageway so that said fibrous structural material moves continuously therethrough comprises passing said fibrous structural material through a passageway substantially sealed from an external environment by a pair of end seals small enough to substantially retain said chemical treatment mixture and large enough to allow said passing of said fibrous structural material.

27. The method according to claim 26, wherein passing said fibrous structural material through a passageway substantially sealed from an external environment by a pair of end seals comprises passing said fibrous structural material through a pair of gas fluid filled chambers.

28. The method according to claim 26 wherein passing said fibrous structural material through a passageway substantially sealed from an external environment by a pair of end seals comprises passing said fibrous structural material through a pair of end seals adjustable to various diameters for accepting various fibrous structural materials for modification.

29. A method of combining two or more materials to form composite material comprising:

providing a treatment apparatus chamber having a passageway passing entirely therethrough, said passageway comprising a first region, a second region, and a constricted medial region between said first region and said second region;

introducing a chemical treatment mixture into said constricted region of said passageway, said chemical treatment mixture comprising at least two compositions which are in a carrier medium, said carrier medium being selected from the group consisting of a supercritical fluid, a near-critical fluid, a superheated fluid, a superheated liquid, and a liquified gas, and wherein said at least two compositions separate from said carrier medium upon a pressure drop when said chemical treatment mixture is flowed through said constricted region of said passageway, said at least two compositions combining to form a composite structure.

30. The method according to claim 29 further comprising extruding said composite structure from an exit orifice attached to said passageway such that said composite structure takes the general shape of said exit orifice.

31. The method according to claim 29 further comprising passing a substrate through said passageway so that said substrate moves continuously therethrough, and said composite structure is coated on said substrate.

* * * * *